United States Patent [19]

Kojima

[11] Patent Number: 5,861,949
[45] Date of Patent: Jan. 19, 1999

[54] ATOMIC ABSORPTION SPECTROPHOTOMETER

[75] Inventor: Seiji Kojima, Otsu, Japan

[73] Assignee: Shimadzu Corporation, Kyoto, Japan

[21] Appl. No.: 878,554

[22] Filed: Jun. 19, 1997

[30] Foreign Application Priority Data

Jun. 21, 1996 [JP] Japan ..................................... 8-181377

[51] Int. Cl.⁶ ....................................................... G01J 3/18
[52] U.S. Cl. ........................................... 356/328; 356/334
[58] Field of Search ........................... 356/328, 330–334, 356/326, 319, 318, 320, 323–325; 702/28; 250/226

[56] References Cited

U.S. PATENT DOCUMENTS 5,268,737  12/1993  Fukuma et al. .

Primary Examiner—K. P. Hantis
Attorney, Agent, or Firm—Armstrong, Westerman, Hattori, McLeland & Naughton

[57] ABSTRACT

Turning on a hollow cathode lamp of an objective element, the intensity of the light is measured while scanning the wavelength within a predetermined range centering around the resonance line of the objective element by rotating a diffraction grating by a pulse motor. Then a spectrum is constructed on the screen of a display unit within the above range, and the user operates an operation unit to point out the peak of the resonance line in the spectrum. The number of the driving pulses sent to the pulse motor when the pointed peak is detected is saved in an EEPROM so that the number corresponds to the wavelength of the resonance line. After that, when the objective element in a sample is measured, the above number is read out from the EEPROM and the pulse signals are sent to the pulse motor by the number, whereby the diffraction grating is set at an angular position corresponding to the resonance line of the element correctly.

5 Claims, 5 Drawing Sheets

Fig. 3

| WAVELENGTH λ [nm] | NUMBER OF PULSES |
|---|---|
| 193.9 | 4333 |
| 194.0 | 4335 |
| 194.1 | 4337 |
| 194.2 | 4339 |
| 247.8 | 5401 |
| 247.9 | 5403 |
| 248.0 | 5405 |
| 248.1 | 5407 |
| 248.2 | 5409 |
| 248.3 | 5411 |
| 248.4 | 5413 |
| 889.9 | 22131 |
| 890.0 | 22134 |
| 890.1 | 22137 |
| 890.2 | 22140 |
| 890.3 | 22143 |

ATOMIC ABSORPTION SPECTROPHOTOMETER

BACKGROUND OF THE INVENTION

FIG. 6 shows a schematic configuration of an atomic absorption spectrophotometer most commonly used. The atomic absorption spectrophotometer includes a hollow cathode lamp having a cathode made from an objective element as a light source 10, whereby a light containing a line spectrum of the resonance lines of the objective element is generated. When the light generated from the light source 10 passes an atomized sample in an atomization unit 11, part of the light at the wavelengths of the resonance lines are selectively absorbed more than the other part of light. After passing the sample, the light is dispersed and selected by a monochromator 12, whereby a monochromatic light having a wavelength of one of the resonance lines of the objective element is extracted. When the monochromatic light is received by a photodetector 13, the photodetector 13 sends a detection signal to an amplifier 14, and the signal amplified thereby is sent to a signal processing unit 15. In the signal processing unit 15, the data on the loss of the intensity of light from the light source is processed to obtain an absorption spectrum within a range including the resonance lines, and the absorption spectrum is displayed by an output unit 16 such as a display.

The monochromator 12 includes an entrance slit, a diffraction grating, an exit slit, etc. The diffraction grating can be rotated by a motor and a monochromatic light of a desired wavelength $\lambda$ can be separated by changing the orientation of the diffraction grating. A speed reducing mechanism is provided between the motor and the diffraction grating because it is necessary to rotate the diffraction grating by a very small angular step when the scanning of the wavelength must be carried out by a very small wavelength interval.

When a pulse motor is used to rotate the diffraction grating, the orientation of the diffraction grating is controlled by, for example, the following steps. First, the relation between the number of the driving pulses, which is the controlling input of the pulse motor, and the wavelength of the light to be extracted by the monochromator 12 is analyzed beforehand, and the result is stored in the form of a table in a memory device. After that, when an analysis for an element is carried out, the numbers of the driving pulse corresponding to the wavelength of resonance line of the element is determined by referring to the table in the memory and the pulses are sent to the pulse motor by the above number, whereby the diffraction grating is set at an angular position corresponding to the above wavelength. Thus a monochromatic light having the wavelength of a resonance line of the objective element is extracted by the monochromator 12.

In the above system, however, usually a transmission error occurs in the relation between the number of driving pulses of the pulse motor and the orientation of the diffraction grating due to the accumulation of minute errors in the parts constituting the speed reducing mechanism. FIG. 7 is a graph showing an example of the transmission error with respect to the feed angle of the motor. When such a transmission error exists, the wavelength of the monochromatic light separated by the monochromator 12 is displaced from the objective wavelength. Here, the degree of the displacement differs depending on the system being used since each system has its own inherent transmission error. In view of this, an expensive speed reduction mechanism including very precise parts such as a harmonic driving mechanism, ball threads, ground feed threads, etc., is used in the conventional system in order to suppress the transmission error mechanically so that the displacement of the wavelength is minimized.

In view of the above problem, the present invention proposes an atomic absorption spectrophotometer which can be used for an analysis with high accuracy even without an expensive speed reducing mechanism.

SUMMARY OF THE INVENTION

In an atomic absorption spectrophotometer for analyzing a sample by a process including steps of passing a light generated by a light source through an atomized sample, extracting a monochromatic light having a predetermined wavelength with a monochromator including a dispersing device and detecting the extracted light by a photodetector, the inventive atomic absorption spectrophotometer includes:

a) a driver for changing the orientation of the dispersing device;

b) a first memory unit for storing data of a relation between the wavelength of the monochromatic light produced with the monochromator and a controlling input of the driver;

c) a controller for varying the controlling input of the driver based on the data of the relation stored in the first memory unit, so that the wavelength is scanned within a predetermined proximity to a wavelength of a resonance line of an objective element, using a light source of the objective element before the analysis of the sample is started;

d) a display unit for displaying the distribution of the intensity of lights detected by the photodetector while the wavelength is scanned;

e) a pointing device for a user to point out a peak corresponding to the objective element in the distribution of the intensity of light displayed on the display unit; and f) a second memory unit for storing data of the controlling input of the driver at the peak position so that the data corresponds to the wavelength of the resonance line of the objective element.

In the inventive atomic absorption spectrophotometer, when an objective element is selected in advance to an analysis of a sample, the controller turns on the light source of the selected element and varies the controlling input of the driver so that the wavelength is scanned within a predetermined range centering around the wavelength of the resonance line of the element. Responsive to the controlling inputs, the driver rotates the dispersing device, whereby monochromatic lights are extracted one after another within the predetermined range of wavelength accordingly. The intensity of each monochromatic light scanned within the predetermined range of wavelength is measured by the photodetector, and the measurement result is displayed on the display unit as a distribution of intensity of light, i.e., the spectrum of the light source within the predetermined range of wavelength.

When there is no transmission error, the peak of the resonance line appears at the center of the spectrum, whereas, when there is a transmission error, the peak appears at a position displaced from the center of the spectrum. The spectrum contains not only the resonance line of the objective element but also other line spectra which appear in proximity to the above resonance line. Therefore, using the pointing device, the user points out on the screen which of all the peaks in the spectrum is the objective peak. Now the transmission error is taken into account, where the value of the controlling input of the driver corresponding to the peak pointed out on the screen correctly corresponds to the wavelength of the resonance line of the objective element. The second memory means stores the value of the controlling input of the driver at the pointed-out position, as the controlling input truly corresponding to the wavelength of the resonance line.

When an actual sample is analyzed, the orientation of the dispersing device is controlled based on the data stored in the second memory unit, whereby the transmission error which arises in the speed reducing mechanism between the driver and the dispersing device is corrected, and the monochromatic light having the wavelength of the resonance line of the objective element is extracted correctly.

The inventive spectrophotometer may be modified so that the first and second memory units are unified, that is, the data stored in the first memory unit are over-written by the data to be stored in the second memory unit.

As described above, by the atomic absorption spectrophotometer according to the present invention, even when the transmission error exists in the speed reduction mechanism between the driver and the dispersing device, the error can be cancelled by the correction process and a monochromatic light having a desired, correct wavelength, can be produced by the monochromator. Therefore, even a speed reducing mechanism having a large transmission error can be used so long as the angle reproducibility of the mechanism is adequately high. A speed reducing mechanism consisting of cheap gear heads generally has a large transmission error while its angle reproducibility is high (for example, smaller than 5[sec] or 5/3600[degree]). Such a cheap speed reducing mechanism can be used in the inventive atomic absorption spectrophotometer without losing the accuracy of analysis since the transmission error is almost cancelled by the correction process. Accordingly, the production cost can be reduced greatly.

Further, in case that the transmission error changes depending on the circumstantial condition, such as the ambient temperature, the transmission error can be properly corrected by carrying out the correction process before measuring the actual sample, whereby the monochromatic light having the wavelength of a resonance line of the objective element can be extracted correctly and an absorption spectrum can be obtained with high accuracy.

BRIEF DESCRIPTION OF THE DRAWINGS

FIG. 3 shows an example of the data stored in the ROM of the above atomic absorption spectrophotometer;

DETAILED DESCRIPTION OF A PREFERRED EMBODIMENT

An embodiment of the atomic absorption spectrophotometer according to the present invention is described below,
referring to FIGS. 1–5. First, a configuration of the present atomic absorption spectrophotometer is described referring to FIG. 1. It should be noted here that the numerals commonly used in both of FIGS. 1 and 6 denote the same elements as described above referring to FIG. 6, and the operation of these elements is basically the same as previously described.

Figure 1:
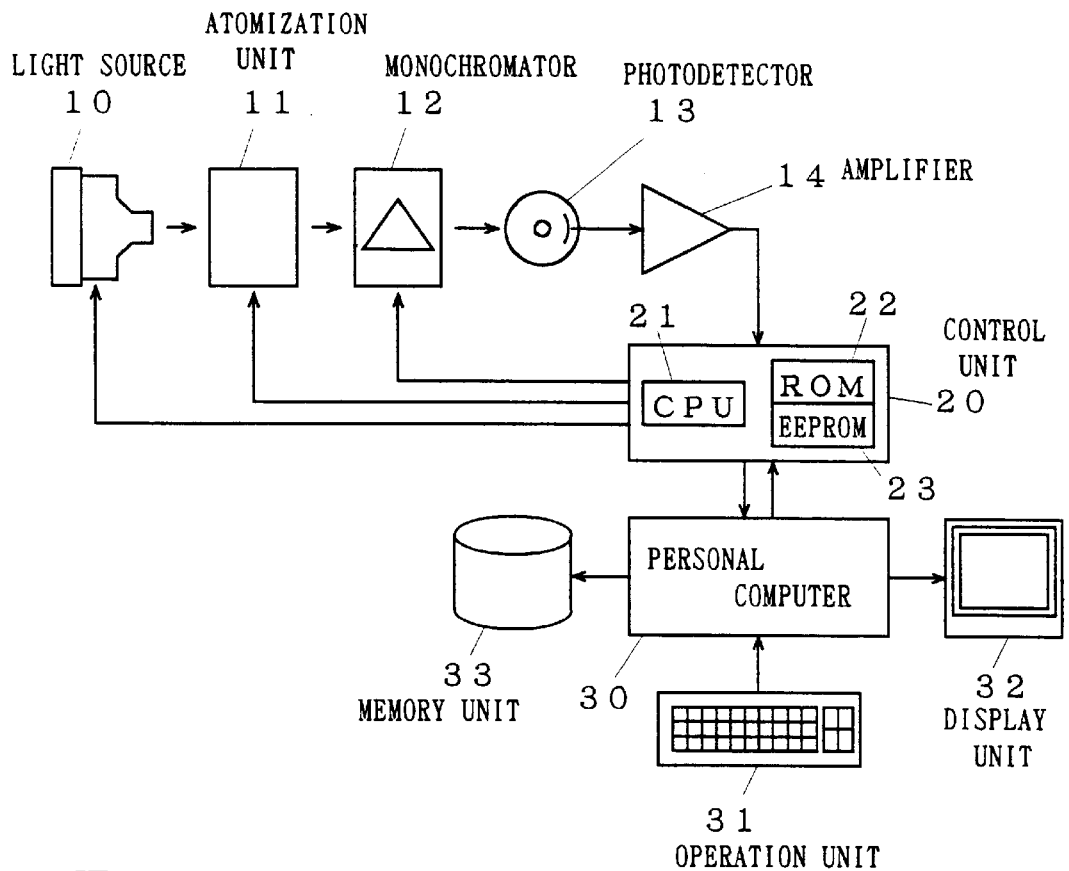
FIG. 1 shows a schematic configuration of an embodiment of the inventive atomic absorption spectrophotometer.

In FIG. 1, the amplifier 14 is connected with a control unit 20 consisting of a CPU (Central Processing Unit) 21, a ROM (Read-Only Memory) 22, an EEPROM (Electrically Erasable Programmable Read-Only Memory) 23 and other electric circuits. The light source 10, the atomization unit 11 and the monochromator 12 are connected with the control unit 20. A personal computer 30, which is set beside the atomic absorption spectrophotometer, is connected with the control unit 20. An operation unit 31 (e.g. keyboard, mouse), a display unit 32 (e.g. cathode ray tube, liquid crystal display) and an external memory unit 33 (e.g. hard disk drive, magnetic optical disk drive) are connected with the personal computer 30.

During the operation, the control unit 20 controls the light source 10, the atomization unit 11 and the monochromator 12 based on instructions from the personal computer 30 for conducting the spectral measurement of the desired element. The signal from the photodetector 13 is amplified by the amplifier 14 and sent to the control unit 20, where the signal is sampled at proper intervals and converted into digital data. The data is sent to the personal computer 30, which carries out various calculations (e.g. the calculation of the absorption ratio).

Figure 2:
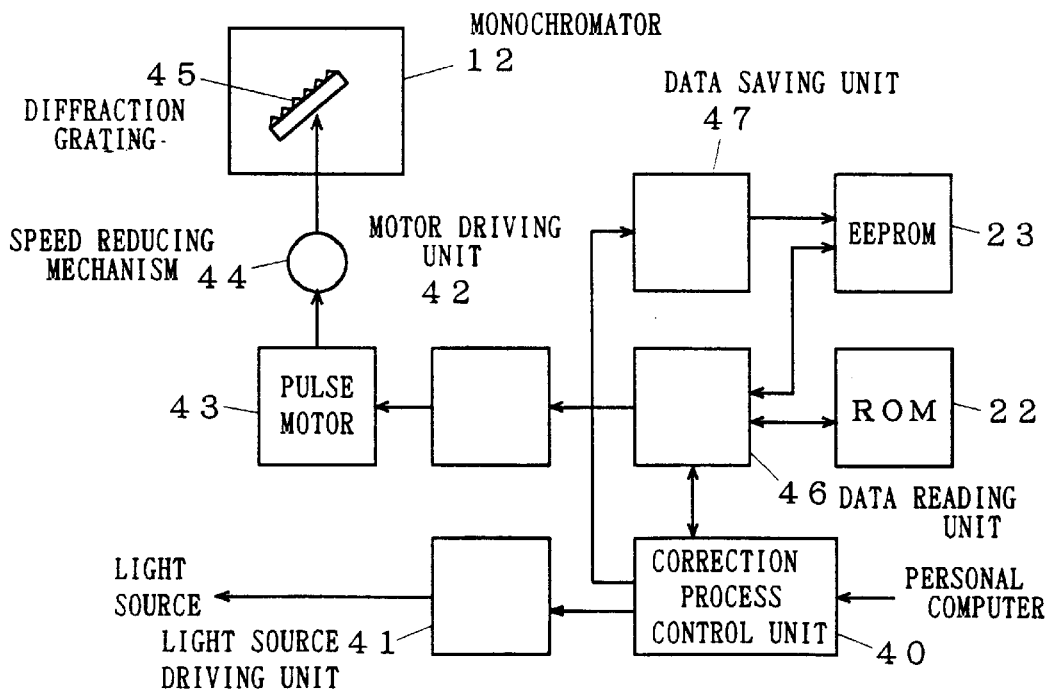
FIG. 2 shows a configuration of the part relevant to the correction process in the above atomic absorption spectrophotometer.

FIG. 2 is a block diagram showing a schematic configuration of the part of the control unit 20 relevant to the correction process. A correction process control unit 40 receives the signal from the personal computer 30 and controls the operation of the light source driving unit 41, data reading unit 46 and data saving unit 47. The data reading unit 46 selectively reads out data from the ROM 22 or EEPROM 23 and sends the data to a motor driving unit 42. The motor driving unit 42 sends pulse signals to a pulse motor 43, where the number of the pulse signals is determined based on the data from the data reading unit 46. The rotation of the pulse motor 43 is transmitted via a speed reducing mechanism 44 to a diffraction grating 45 of the monochromator 12, whereby the diffraction grating 45 is set at an angular position corresponding to the number of the pulse signals.

In the ROM 22, a table showing the relation between the wavelength and the number of the pulse signals is stored beforehand, for example before the spectrophotometer is shipped out of the factory. FIG. 3 is an example of the table. Referring to FIG. 3, when a monochromatic light having a wavelength of 194.1 [nm] is to be extracted, 4337 pulse signals are sent to the pulse motor 43 to rotate the diffraction grating 45 by a desired angle.

In the example of FIG. 3, the number of the driving pulses is predetermined for every wavelength value of 0.1 [nm] step, which is the smallest step of scanning the wavelength. Of course, the number of the driving pulses may be determined for every wavelength interval larger than that and the number of the driving pulses corresponding to a wavelength within each interval may be calculated out.

Figure 4:
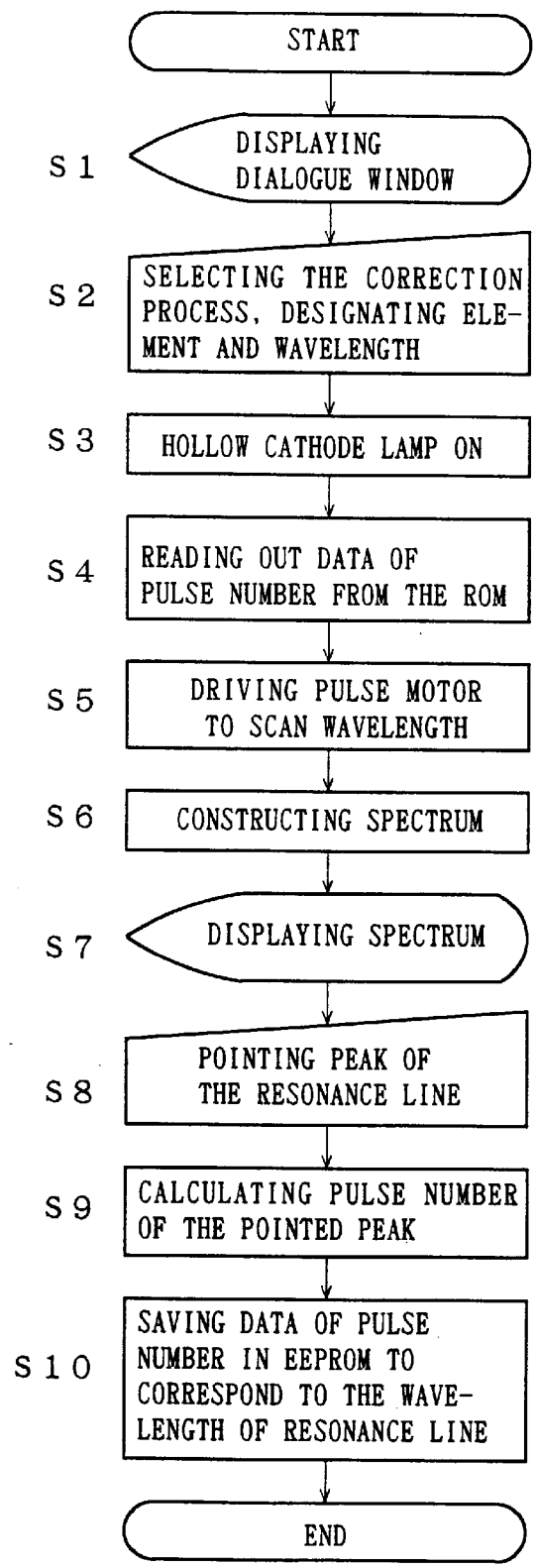
FIG. 4 is a flow chart of the correction process by the above atomic absorption spectrophotometer.

Practically, since the speed reducing mechanism 44 has a transmission error, the diffraction grating 45 cannot be set at a desired angular position exactly, even when the pulse signals are sent to the pulse motor 43 by the number determined based on the table of FIG. 3. Hence, the correction process is carried out to compensate for the transmission error. FIG. 4 is a flow chart showing an example of the correction process. In the following description, the objective element is assumed to be iron (Fe).

When a user operates the operation unit 31 in a predetermined way, the personal computer 30 displays on the display unit 32 a dialogue window relating to the maintenance (Step S1). Then, in the dialogue window, the user selects "the execution of the process of correcting the transmission error", designates the element "Fe" and the wavelength of the resonance line of Fe (248.3[nm]), and instructs the personal computer 30 to start the correction process (Step S2). Then the personal computer 30 sends a correction process starting signal to the control unit 20, on which the correction process control unit 40 controls the light source driving unit 41 so that the hollow cathode lamp of Fe in the light source 10 is turned on (Step S3). Here, if the light source 10 is designed so that the hollow cathode lamp should be changed manually, the user should set a hollow cathode lamp of Fe beforehand. Otherwise, if the light source 10 is provided with an automatic changing mechanism which can be equipped with a plurality of hollow cathode lamps, where one of the hollow cathode lamps is set for use automatically, the correction process control unit 40 controls the automatic changing mechanism so that the hollow cathode lamp of Fe is set for use and turns the lamp on.

In the correction process, the wavelength is scanned within a predetermined range of wavelength centering around the resonance line, for example 248.3±0.5[nm]. Therefore, the correction process control unit 40 controls the data reading unit 46 so that the data of the number of the pulses corresponding to the wavelength within the above range, i.e. 247.8–248.8[nm], are read out from the ROM 22 (Step S4). That is, the data reading unit 46 sends a proper address signal to the ROM 22, then reads out the data, and sends the data to the motor driving unit 42 one after another. In the present case, the numbers of the pulses that are read out from the ROM 22 and sent to the motor driving unit 42 are from 5401 to 5421 (see FIG. 3). Then the motor driving unit 42 sends pulse signals by the above number to the pulse motor 43 one after another, whereby the diffraction grating 45 of the monochromator 12 is rotated by a minimal angle step by step. Thus the wavelengths are scanned (Step S5). The light generated by the light source 10 passes the atomization unit 11, which is not charged with a sample, and enters the monochromator 12, where the monochromatic lights are produced one after another within the above range of wavelength and sent to the photodetector 13.

Figure 5A:
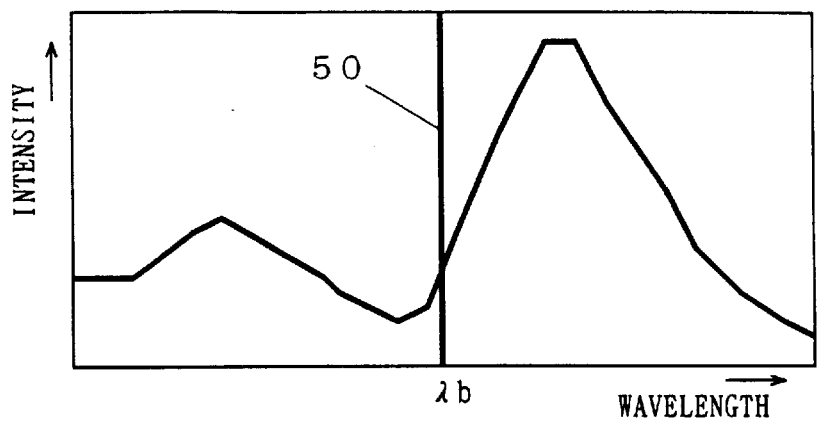
FIGS. 5A, 5B and 5C are graphs for explaining the steps of the correction process.
Figure 6:
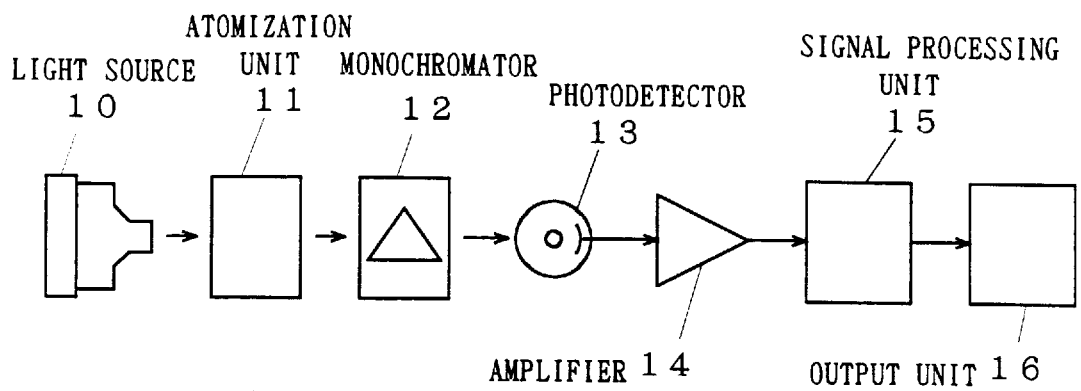
FIG. 6 shows a schematic configuration of a conventionally used atomic absorption spectrophotometer.
Figure 7:
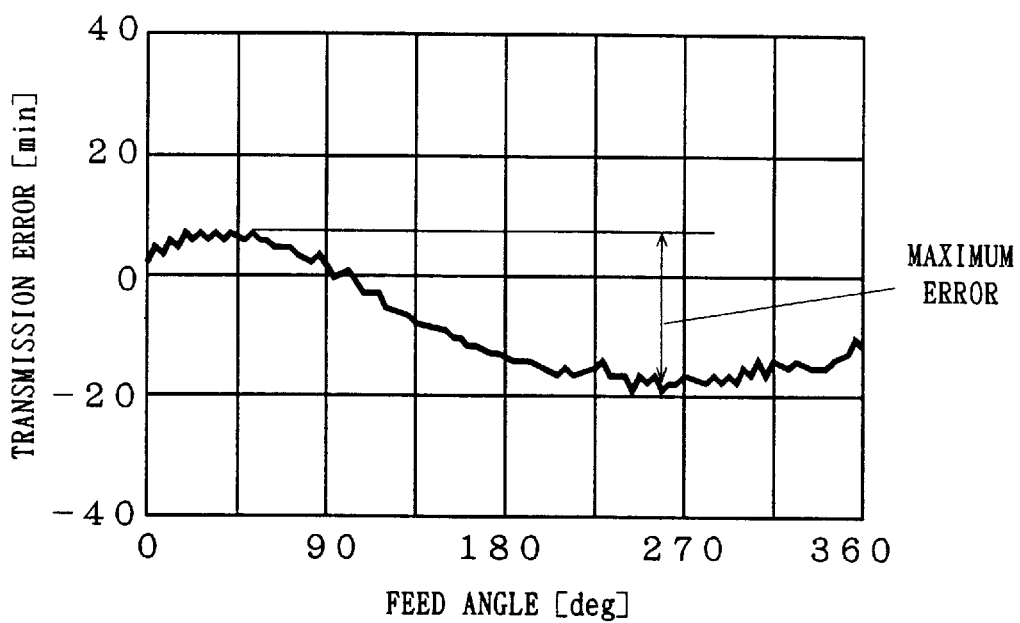
FIG. 7 is a graph showing an example of the transmission error.

On receiving the monochromatic light, the photodetector 13 generates an electric signal corresponding to the intensity of the light and sends it via the amplifier 14 to the control unit 20. The control unit 20 converts the electric signal into digital data and sends the data to the personal computer 30. The personal computer 30 constructs a spectrum using the data (Step S6) and displays it on the display unit 32 (Step S7). FIG. 5A shows an example of the spectrum constructed within the range of 247.8–248.8[nm]. When no transmission error exists, a peak corresponding to the resonance line of the object element appears at the center of the spectrum. In FIG. 5A, however, no peak is detected at the position λb, i.e. the center of the spectrum. This means that the speed reducing mechanism 44 has a transmission error.

Figure 5B:
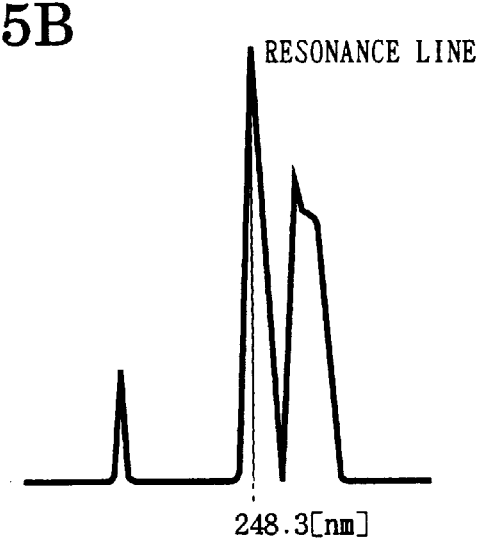
Figure 5C:
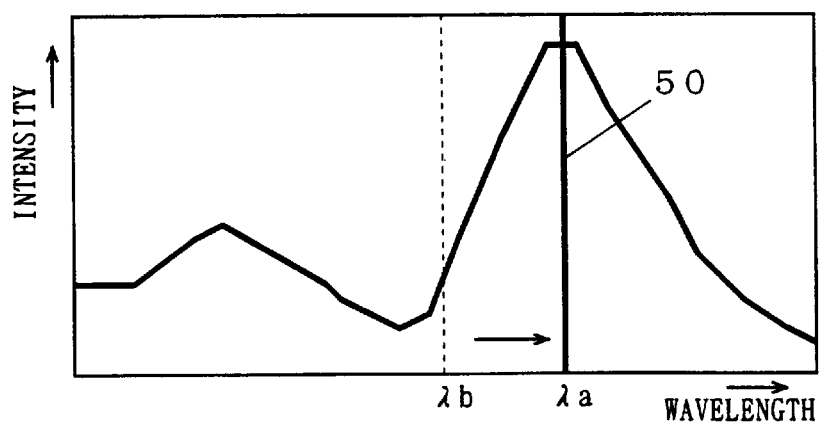

Then, comparing the spectrum of FIG. 5A and a standard profile of the spectrum of the hollow cathode lamp presented by the maker of the lamp (as shown in FIG. 5B), the user judges which of the peaks in the spectrum on the screen truly corresponds to the resonance line, 248.3[nm]. In the present case, the peak at the position λa corresponds to the resonance line (FIG. 5C). Accordingly, the user moves the cursor 50 on the screen to point the position λa by operating the operation unit 31 (Step S8).

Based on the data read out from the ROM 22, the correction process control unit 40 calculates the number P of the pulses corresponding to the pointed position, λa (Step S9). For example, provided that the position λa is 248.5 [nm], then the pulse number P is 5415, as readily calculated using the table of FIG. 3. That is, the pulse number 5415 actually corresponds to the wavelength 248.3[nm] (the resonance line of Fe) rather than 248.5[nm] given by the table in the ROM 22. Therefore, the correction process control unit 40 controls the data saving unit 47 to save the data of the pulse number P(=5415) and the wavelength 248.3[nm] in the EEPROM 23 as a pair of data corresponding to each other (Step S10), whereby a new table is formed in the EEPROM 23 containing the data showing the relation between the wavelength of the resonance line and the pulse number which compensate for the transmission error.

The user may repeat the above correction process using other atomic elements, if necessary. For example, when the correction process is carried out for nickel (Ni) or manganese (Mn), the pulse number corresponding to the resonance line 232.0[nm] for Ni or 279.5[nm] for Mn is obtained, and the data are saved in the EEPROM 23.

When the objective element in a sample is actually measured, the control unit 20 reads out the number of the pulses corresponding to the wavelength of the resonance line of the element selected by the user from the EEPROM 23 and sends the number to the motor driving unit 42. Then the motor driving unit 42 sends pulses to the pulse motor 43 by a number which is obtained by calculating the difference between the number read out from the EEPROM 23 and the number corresponding to the angular position at which the pulse motor 43 is set at the moment. Thus the diffraction grating is set at an angular position corresponding to the resonance line of the objective element.

In the above spectrophotometer, it is preferable to determine the wavelength range to be scanned in Step S5 beforehand, taking account of the maximum estimation of the transmission error in the speed reducing mechanism 44, so that the resonance line of the objective element comes more assuredly within the range. For example, when the speed reduction mechanism is composed of such cheap gear heads that the maximum transmission error is ±0.7[nm], the wavelength range to be scanned may be ±1.0[nm] or there about.

Basically, the user has only to carry out the correction process just once before the first use of the spectrophotometer, using all the elements that the user intends to measure. It is recommendable, however, to carry out the correction process just before the start of an analysis when, for example, the spectrophotometer is set at a place where the circumstantial condition, e.g. the ambient temperature, greatly changes. By this method, since the error due to the circumstantial change is cancelled by the correction process, more reliable data is obtained regarding the relation between the pulse number and the wavelength under the circumstantial condition, whereby the accuracy of the measurement is enhanced.

In the above spectrophotometer, the ROM 22 is used for storing the original data prepared beforehand without taking account of the transmission error, while the EEPROM 23 is used for saving the correct data obtained by the correction process. The spectrophotometer can be modified so that the original data are stored in a rewritable device such as EEPROM beforehand and, when correct data are obtained by the correction process, the data are written in the EEPROM over the original data corresponding to the same wavelengths. Further, for example, the data obtained by the correction process may be saved as a data file on a hard disk of the personal computer in addition to saving the data in the EEPROM.

It should be appreciated hereby that the above embodiments are illustrative and not restrictive and can be modified in various ways within the true spirit and scope of the attached claims.

What is claimed is:

1. An atomic absorption spectrophotometer for analyzing a sample by a process including steps of passing a light generated by a light source through an atomized sample, extracting a monochromatic light having a predetermined wavelength with a monochromator including a dispersing device and detecting the extracted light by a photodetector, comprising:

a) driving means for changing the orientation of the dispersing device;
   b) first memory means for storing data of a relation between the wavelength of the monochromatic light produced with the monochromator and a controlling input of the driving means;
   c) control means for varying the controlling input of the driving means based on the data of the relation stored in the first memory means, so that the wavelength is scanned within a predetermined proximity to a wavelength of a resonance line of an objective element, using a light source of the objective element before an analysis of the sample is started;
   d) displaying means for displaying a distribution of the intensity of light detected by the photodetector while the wavelength is scanned;
   e) pointing means for a user to point out a peak corresponding to the objective element in the distribution of the intensity of light displayed on a display unit; and
   f) second memory means for storing data of the controlling input of the driving means at the peak position so that the data corresponds to the wavelength of the resonance line of the objective element.

2. The atomic absorption spectrophotometer according to claim 1, wherein the driving means include a pulse motor and the controlling input of the driving means is a number by which the pulse signals are sent to the pulse motor.

3. The atomic absorption spectrophotometer according to claim 1, wherein the second memory means include an Electrically Erasable Programmable Read-Only Memory.

4. The atomic absorption spectrophotometer according to claim 2, wherein the second memory means include an Electrically Erasable Programmable Read-Only Memory.

5. The atomic absorption spectrophotometer according to one of claims 1–4, wherein the first and the second memory means are unified so that original data stored in the first memory means are over-written by data to be stored in the second memory means.

* * * * *